(12) United States Patent
Guinot et al.

(10) Patent No.: US 11,358,462 B2
(45) Date of Patent: Jun. 14, 2022

(54) TRANSMISSION DEVICE FOR A HYBRID VEHICLE

(71) Applicant: VALEO EMBRAYAGES, Amiens (FR)

(72) Inventors: Thierry Guinot, Cergy Pontoise (FR); Fabien Lebeau, Cergy Pontoise (FR); Ivan Dutier, Cergy Pontoise (FR)

(73) Assignee: VALEO EMBRAYAGES, Amiens (FR)

( * ) Notice: Subject to any disclaimer, the term of this patent is extended or adjusted under 35 U.S.C. 154(b) by 0 days.

(21) Appl. No.: 16/977,336

(22) PCT Filed: Feb. 27, 2019

(86) PCT No.: PCT/EP2019/054906
§ 371 (c)(1),
(2) Date: Sep. 1, 2020

(87) PCT Pub. No.: WO2019/166515
PCT Pub. Date: Sep. 6, 2019

(65) Prior Publication Data
US 2021/0101467 A1     Apr. 8, 2021

(30) Foreign Application Priority Data

Mar. 2, 2018  (FR) ...................... 18 51829

(51) Int. Cl.
*B60K 6/26* (2007.10)
*B60K 6/387* (2007.10)

(52) U.S. Cl.
CPC ............... *B60K 6/387* (2013.01); *B60K 6/26* (2013.01); *B60Y 2200/92* (2013.01)

(58) Field of Classification Search
CPC .. B60K 6/387; B60K 6/26; B60K 2006/4825; B60K 6/48; B60K 6/405; B60K 6/40;
(Continued)

(56) References Cited

U.S. PATENT DOCUMENTS

2007/0213163 A1 * 9/2007 Combes ................... B60K 6/26
                                                             475/100
2009/0000896 A1   1/2009 Knowles
                          (Continued)

FOREIGN PATENT DOCUMENTS

DE   10 2012 024 699 A1   7/2013
EP        2 011 682 A2    1/2009
                          (Continued)

OTHER PUBLICATIONS

International Search Report dated May 14, 2019 in PCT/EP2019/054906 filed Feb. 27, 2019, citing documents AA-AB and AO-AR therein, 2 pages.

*Primary Examiner* — David J Hlavka
(74) *Attorney, Agent, or Firm* — Oblon, McClelland, Maier & Neustadt, L.L.P.

(57) ABSTRACT

A torque transmission device for a vehicle includes a torque input element coupled to a crankshaft of a combustion engine, a first torque output element coupled to a first input shaft of a gearbox, a rotating electric machine including a stator and a rotor arranged in the direction of the transmission of torque, between the input element and the first output element, a rotor support radially supporting the rotor of the rotating electric machine, the rotor support selectively connected to the input element by an input clutch, a fixed distributor fastened to the gearbox and supporting the rotor support, a fixed wall including a first radial end fastened to the gearbox, and a second radial end connected to the torque input element, a first rolling member arranged between the rotor support and the fixed distributor, and a second rolling member arranged between the rotor support and the fixed wall.

12 Claims, 2 Drawing Sheets

Figure 1:
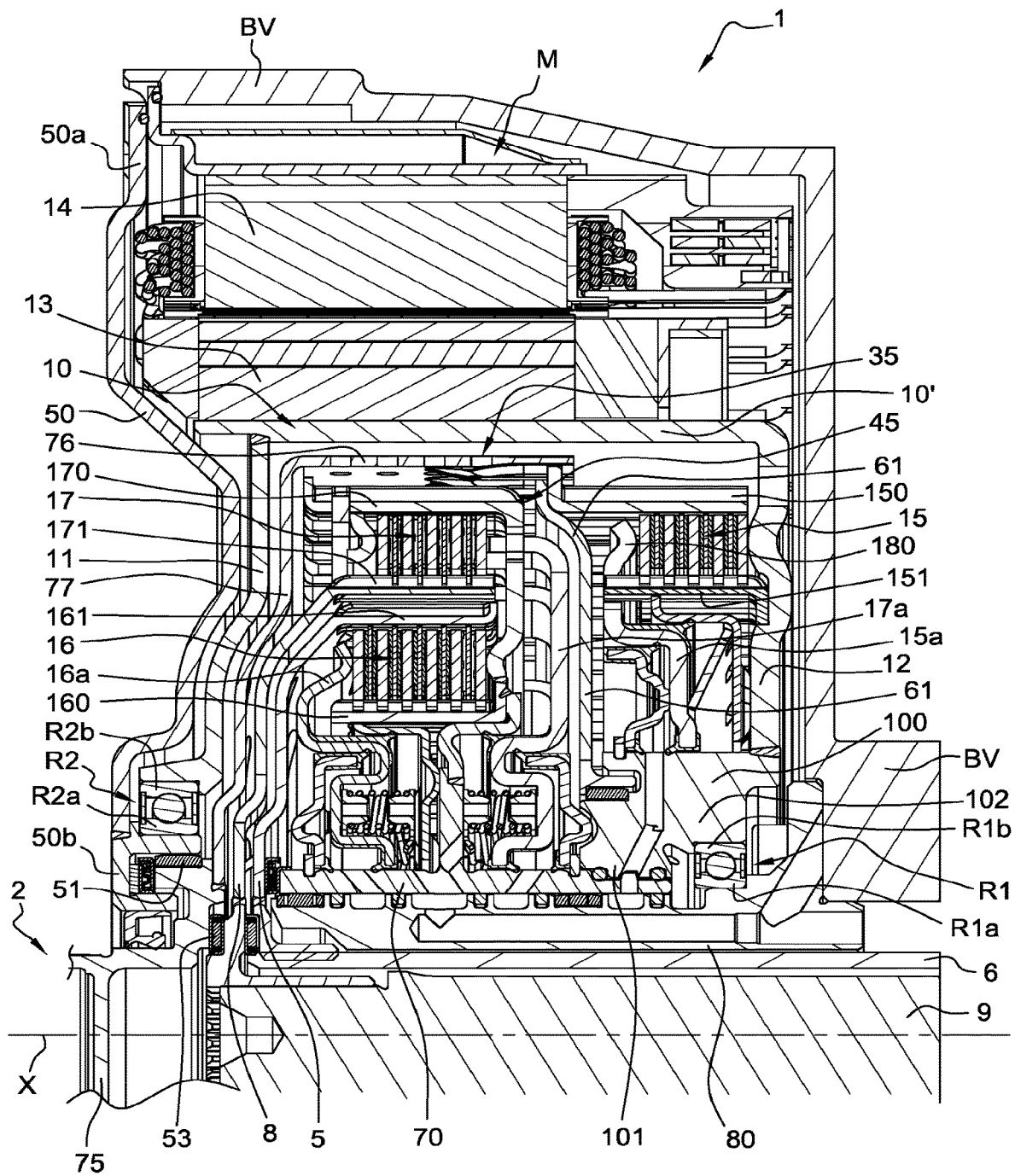

(58) Field of Classification Search
CPC ............ B60Y 2200/92; B60Y 2400/42; F16D 25/0638; F16D 25/10; F16D 25/12
See application file for complete search history.

(56) References Cited

U.S. PATENT DOCUMENTS

2009/0008212 A1* 1/2009 Combes .................. B60K 6/48
                                                    192/113.34
2018/0313409 A1* 11/2018 Iizuka ..................... F16D 25/10
2018/0313410 A1* 11/2018 Toyama ................. B60K 6/387

FOREIGN PATENT DOCUMENTS

WO    WO 2005/118321 A1    12/2005
WO    WO 2008/025691 A1    3/2008

* cited by examiner

TRANSMISSION DEVICE FOR A HYBRID VEHICLE

The present invention relates to the field of transmissions for motor vehicles. It relates in particular to a transmission device intended to be arranged, in the transmission chain, between a combustion engine and a gearbox.

The invention particularly concerns transmission devices for a hybrid motor vehicle in which a rotating electric machine is also arranged between the combustion engine and the gearbox.

Transmission assemblies arranged between the gearbox and the combustion engine and comprising a rotating electric machine and a clutch on the engine side allowing the crankshaft of the combustion engine to be coupled in rotation to the rotor of the electric machine are known in the prior art. It is thus possible to turn off the combustion engine every time the vehicle stops and to restart it using the rotating electric machine. The rotating electric machine can also constitute an electric brake or provide a power boost to the combustion engine to assist it or prevent it from stalling. The rotating electric machine can also drive the vehicle. When the engine is running, the rotating electric machine acts as an alternator. Such a transmission assembly can also connect the rotating electric machine to the gearbox via two separate torque paths each comprising an output clutch and a gearbox input shaft.

There exist devices comprising three separate actuating members for actuating three clutches, an input clutch between the combustion engine and the rotating electric machine, and two output clutches between the rotating electric machine and the two input shafts of a gearbox. In these devices, the rotating electric machine comprises a stator and a rotor driven to rotate about an axis of rotation.

The rotating electric machine and its components (rotor, stator, sensor(s), etc.) are particularly heavy and comprise an unbalance associated with their manufacture, this being capable of increasing the load on the support of the rotor. Moreover, an acceleration of the vehicle can multiply by 10 or 20 the load on the support of the rotor. It is therefore necessary to have a torque transmission device making it possible to support, center and rotationally guide this rotating electric machine and in particular the rotor. This problem is at the heart of the present invention.

The invention also aims to make it possible to benefit from a torque transmission device allowing reliable and simplified mounting. The invention additionally aims to make it possible to benefit from a torque transmission device having a long service life and a high degree of efficiency.

The invention achieves this, according to one of its aspects, with the aid of a torque transmission device, in particular for a motor vehicle, comprising:

- a torque input element, capable of being coupled in rotation to a crankshaft of a combustion engine,
- a first torque output element, capable of being coupled in rotation to a first input shaft of a gearbox,
- a rotating electric machine comprising a stator and a rotor arranged in the direction of the transmission of torque, between the input element and the first output element,
- a rotor support radially supporting the rotor of the rotating electric machine, the rotor support being selectively connected to the input element by an input clutch,
- a fixed distributor capable of being fastened to the gearbox and supporting the rotor support,
- a fixed wall comprising a first radial end capable of being fastened to the gearbox, and a second radial end connected to the torque input element,
- a first rolling member being arranged between the rotor support and the fixed distributor, and a second rolling member being arranged between the rotor support and the fixed wall.

The rotor support is thus guided in rotation in an optimized manner without its efficiency being reduced over time. Specifically, the device has a particularly robust mechanical connection, of the pivot type, between the rotor, via the rotor support, and a fixed element or an element fastened to the gearbox.

The first rolling member and the second rolling member are ball-joint connections and jointly provide a pivot connection indispensable for correctly guiding the rotating electric machine. Specifically, the kinematic study of a rolling member (generally a ball bearing with one row of balls) leads to this component being modeled by a ball-joint connection. The mechanical actions which can be transmitted by the contacts between the balls and the rings are essentially radial or oblique and intersect at the same point. The screw theory in respect of the mechanical actions which can be transmitted by a ball bearing is therefore similar to that of a ball-joint connection.

According to one aspect of the invention, the rotor support comprises a first transverse wall, a second transverse wall and a back connecting the two transverse walls. The rotor support forms an inverted "U" when it is seen in section from the upper portion of the device with respect to the axis of rotation. In the case of a section of the lower portion of the device, the rotor support forms a "U".

According to an additional aspect of the invention, a main hub is connected to the first output element via a first output clutch.

According to the invention, the input clutch and the first output clutch can be of the multidisk type.

According to another aspect of the invention, the second transverse wall of the rotor support comprises a lower part, said lower part comprising a first portion connected to a main hub, and a second portion.

According to the invention, the first portion of the lower part of the rotor support is in splined connection with the main hub.

According to one feature of the invention, the first rolling member comprises an inner ring and an outer ring, said inner ring being in contact with the fixed distributor, and said outer ring being in contact with the rotor support. Advantageously, the first rolling member is a ball bearing with one row of balls.

According to the invention, said outer ring of the first rolling member is in contact with the second portion of the lower part of the rotor support.

According to another feature of the invention, the second rolling member comprises an inner ring and an outer ring, said inner ring being in contact with the fixed wall, and said outer ring being in contact with the rotor support. Advantageously, the second rolling member is a ball bearing with one row of balls.

According to the invention, said outer ring of the second rolling member is in contact with the first transverse wall of the rotor support.

According to a variant embodiment of the invention, the second rolling member comprises an inner ring and an outer ring, said inner ring being in contact with the rotor support, and said outer ring being in contact with the fixed wall.

According to this variant, said inner ring of the second rolling member is in contact with the first transverse wall of the rotor support.

According to one aspect of the invention, the torque transmission device can comprise a second torque output element, capable of being coupled in rotation to a second input shaft of a gearbox, the second output element being arranged in parallel with the first output element in the direction of the transmission of torque.

The invention will be better understood, and other aims, details, features and advantages thereof will become clearer, from the following description of several particular embodiments of the invention, provided solely by way of nonlimiting illustration, with reference to the attached figures.

Figure 2:
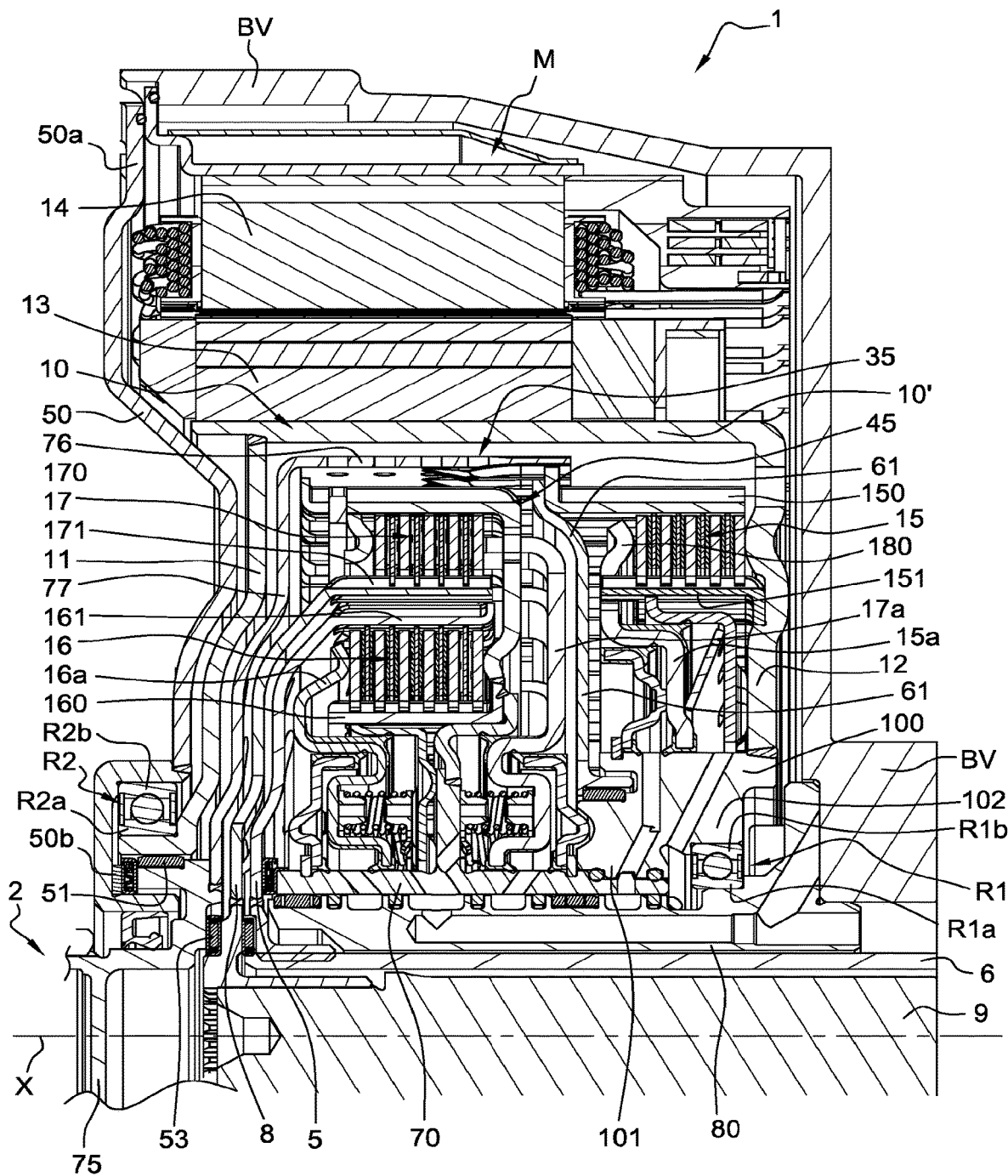

FIG. 1 is a view in axial section of an example of the device according to the invention and according to a first embodiment, FIG. 2 is a view in axial section of an example of the device according to the invention and according to a second embodiment.

With reference to FIG. 1, a torque transmission device 1 is shown comprising:
- a torque input element 2, capable of being coupled in rotation to a crankshaft of a combustion engine,
- a first torque output element 5, capable of being coupled in rotation to a first input shaft 6 of a gearbox,
- a second torque output element 8, capable of being coupled in rotation to a second input shaft 9 of the gearbox.

The first and second output elements 5, 8 respectively comprise a first and a second disk connected by a, for example splined, connection to the first and second input shaft 6, 9 of the gearbox, respectively. The first input shaft 6 of the gearbox is hollow and surrounds the second input shaft 9 of the gearbox.

A torsion damper device (not shown) can be positioned between the crankshaft of the combustion engine and the torque input element 2.

In the examples under consideration, the second output element 8 is arranged in parallel with the first output element 5 in the direction of the transmission of torque. Each of these elements rotates about an axis of rotation X of the device.

The device also comprises a rotating electric machine M comprising a rotor 13 and a stator 14. The stator 14 is fixed and is fastened to the gearbox. The stator 14 is fixed and is arranged around the rotor 13. The rotor 13 is arranged in the direction of the transmission of torque, between the input element 2 on the one hand and the first output element 5 and the second output element 8 on the other hand.

In the example under consideration, the rotating electric machine M is a synchronous machine with permanent magnets.

The rotor 13 of the rotating electric machine is selectively connected to the input element 2 by an input clutch 15, to the first output element 5 by a first output clutch 16, and to the second output element 8 by a second output clutch 17.

The clutches 15, 16, 17 are of the multidisk type. Each of the clutches 15, 16, 17 has an associated actuating member 15a, 16a, 17a.

The device 1 also comprises a rotor support 10 for the radial holding thereof. The rotor support 10 comprises a first transverse wall 11, a second transverse wall 12 and a back 10' connecting the two transverse walls 11, 12. The back 10' is thus in contact with the rotor 13 of the rotating electric machine M. The back 10' and the two transverse walls 11, 12 can be a single part. Alternatively, the back 10' and the two transverse walls 11, 12 can be separate parts. The transverse wall 11 and/or the transverse wall 12 can be welded to the back 10'. The transverse wall 11 and the transverse wall 12 are substantially parallel and take the form of a radial extension with respect to the back 10', which has an axial extension. The rotor support 10 thus forms an inverted "U" when it is seen in section.

The rotor support 10 maintains the rotating electric machine M in rotation about the axis of rotation. The rotating electric machine M is then referred to as "in-line", that is to say that the axis of rotation of the rotating electric machine M is coincident with the axis of rotation X of the torque transmission device 1.

The input clutch 15 comprises an input disk-carrier 150 driven to rotate by a first element. The first element can be the input element 2.

The input disk-carrier 150 extends axially between a first end and a second end, the first end being driven to rotate by the first element, which can be the input element 2.

The input clutch 15 comprises an output disk-carrier 151 locked in rotation with a second element. The second element can be the rotor support 10.

The output disk-carrier 151 extends axially between a first end and a second end, the first end being locked in rotation with the second element, which can be the rotor support 10.

The input clutch 15 comprises a multidisk assembly. The multidisk assembly comprises at least one friction disk locked in rotation with one of the input and output disk-carriers. The at least one friction disk is for example locked in rotation with the input disk-carrier 150. The multidisk assembly comprises at least two plates respectively arranged on either side of each friction disk. The plates can be locked in rotation with the other of the input and output disk-carriers. The plates are for example locked in rotation with the output disk-carrier 151. The multidisk assembly comprises friction linings arranged between the plates and a friction disk.

The clutch 15 can describe a disengaged position and an engaged position in which said plates and the friction disk clamp the friction linings so as to transmit a torque between the input disk-carrier 150 and the output disk-carrier 151.

The actuating member 15a is movable axially between a rest position and an active position in which said actuating member 15a exerts an axial force on the multidisk assembly in order to bring the input clutch 15 into the engaged position.

The actuating member 15a extends radially between a first end and a second end adapted to exert the axial force on the multidisk assembly.

Alternatively or additionally, the first output clutch 16 comprises an input disk-carrier 160 driven to rotate by a first element. The first element can be the rotor support 10. The rotor support 10 can drive the input disk-carrier 160 to rotate via a link element, for example a main hub 70. The mechanical connection between the rotor support 10 and the main hub 70 will be detailed below.

The input disk-carrier 160 extends axially between a first end and a second end. The first end is driven to rotate by the first element.

The first output clutch 16 comprises an output disk-carrier 161 locked in rotation with a second element. The second element can be the first output element 5.

The output disk-carrier 161 extends axially between a first end and a second end, the first end being locked in rotation with the second element.

The first output clutch 16 comprises a multidisk assembly. The multidisk assembly has the same technical features as the multidisk assembly of the input clutch 15.

The first output clutch 16 can describe a disengaged position and an engaged position in which said plates and the friction disk clamp the friction linings so as to transmit a torque between the input disk-carrier 160 and the output disk-carrier 161.

The actuating member 16*a* of the first output clutch 16 has some or all of the technical features of the actuating member 15*a* of the input clutch 15.

The second end of the input disk-carrier 160 or the second end of the output disk-carrier 161 can comprise at least one guide extending axially from said second end.

Alternatively or additionally, the second output clutch 17 comprises an input disk-carrier 170 driven to rotate by a first element. The first element can be the rotor support 10. The rotor support 10 can drive the input disk-carrier 170 to rotate via a link element, for example the main hub 70.

The input disk-carrier 170 extends axially between a first end and a second end. The first end is driven to rotate by the first element.

The second output clutch 17 comprises an output disk-carrier 171 locked in rotation with a second element. The second element can be the second output element 8.

The output disk-carrier 171 extends axially between a first end and a second end. The first end is locked in rotation with the second element, which can be the second output element 8.

The second output clutch 17 comprises a multidisk assembly. The multidisk assembly has the same technical features as the multidisk assembly of the input clutch 15 and/or as the multidisk assembly of the first output clutch 16.

The second output clutch 17 can describe a disengaged position and an engaged position in which said plates and the friction disk clamp the friction linings so as to transmit a torque between the input disk-carrier 170 and the output disk-carrier 171.

The actuating member 17*a* of the second output clutch 17 has some or all of the technical features of the actuating member 15*a* of the input clutch 15 and/or of the actuating member 16*a* of the first output clutch 16.

The second end of the input disk-carrier 170 or the second end of the output disk-carrier 171 can comprise at least one guide extending axially from said second end.

The first input shaft 6 of the gearbox is coupled in rotation to the crankshaft and is driven by it to rotate when the first clutch 15 and the first output clutch 16 are configured in a so-called engaged position. In this configuration, the rotor 13 can also supply a power boost to the gearbox.

The first input shaft 6 of the gearbox is coupled in rotation to the rotor 13 and is driven by it to rotate when the first clutch 15 is configured in a so-called disengaged position and the first output clutch 16 is configured in the engaged position. The first shaft of the gearbox is then driven solely by the rotor 13. In this configuration, the rotating electric machine M can also act as a brake and be in an energy recovery mode.

Analogously, the second input shaft 9 of the gearbox is coupled in rotation to the crankshaft and is driven by it to rotate when the first clutch 15 and the second output clutch 17 are configured in a so-called engaged position.

The second input shaft 9 of the gearbox is coupled in rotation to the rotor 13 and driven by it to rotate when the first clutch 15 is configured in a so-called disengaged position and the second output clutch 17 is configured in the engaged position. The second shaft of the gearbox is then driven solely by the rotor 13.

When the first and second output clutches 16, 17 are in the disengaged configuration and the input clutch 15 is in the engaged configuration, the rotor 13 can be driven by the combustion engine. The rotating electric machine is then in an energy recovery mode.

The first output clutch 16 is, for example, arranged to engage the odd gears of the gearbox, and the second output clutch 17 is, for example, arranged to engage the even and reverse gears of the gearbox. Alternatively, the gears handled by said first output clutch 16 and said second output clutch 17 can be respectively reversed.

The clutches are arranged to alternately transmit a so-called input power—a torque and a rotating speed—from the combustion engine to one of the two gearbox input shafts, depending on the respective configuration of each output clutch 16, 17 and the input clutch 15. The device is then in so-called "direct" mode. The input clutch 15 can also transmit a torque to the combustion engine, and the device is then in so-called "back" mode.

The output clutches 16, 17 can be arranged so that they are not simultaneously in the same engaged configuration. Conversely, they can be simultaneously configured in their disengaged position.

The input clutch 15 is offset axially from the output clutches 16, 17 away from the input element 2. The output clutches 16, 17 are superposed radially.

For further details relating to operation of the clutches 15, 16, 17 and the associated actuating members, reference can be made to French patent application no. 1756978 filed on Jul. 21, 2017 in the name of Valeo Embrayages.

The rotor support 10 simultaneously encapsulates the clutches 15, 16, 17 and the actuating members 15*a*, 16*a*, 17*a*.

As seen above, the device 1 comprises a main hub 70. Said main hub 70 can be selectively connected to the first output element 5 and to the second output element 8 by the first and second output clutch 16, 17, respectively.

The rotor support 10 and more particularly the second transverse wall 12 comprises a lower part 100 facing the main hub 70. Said lower part 100 comprises a first portion 101 and a second portion 102.

The connection between the first portion 101 of the lower part 100 of the rotor support 10 and the main hub 70 is an embedded connection produced in the form of a splined connection, such as for example of splines. Thus, the rotor support 10 is locked in rotation with the main hub 70 and makes it possible to transmit the torque between said rotor support 10 and the main hub 70 while maintaining a robust link between the two elements.

The torque transmission device 1 comprises at least one fastening member adapted to maintain the splined connection between the first portion 101 of the lower part 100 of the rotor support 10 and the main hub 70. More particularly, the at least one fastening member is adapted to maintain the embedded connection of the first portion 101 of the lower part 100 of the rotor support 10 and the main hub 70.

The fastening member can be chosen from screws, nuts or rivets distributed around a periphery of the axis of rotation X. This fastening member is arranged radially at the same level as the main hub 70. This fastening member makes it possible for the device 1 to be mounted and/or demounted easily.

The lower part 100 of the rotor support 10 is situated radially below, or radially within, the input clutch 15. The lower part 100 is likewise situated below, or radially inside, the actuating member 15*a* of the input clutch 15. The lower part 100 is, for the passage of the torque, situated between the transverse wall 12 and the first and second output clutches 16, 17. The lower part 100 of the rotor support 10 delimits in part a sealed chamber associated with the input clutch 15.

The lower part 100 and the transverse wall 12 can be a single part. Alternatively, the lower part 100 and the transverse wall 12 are separate parts. In the example of FIG. 1, the lower part 100 and the transverse wall 12 are welded to one another.

A fixed distributor 80 supports the rotor support 10 and the main hub 70. The fixed distributor 80 is fastened to a fixed portion of the gearbox By. The fixed distributor 80 centers and rotationally guides the rotor support 10. The distributor 80 radially bears the main hub 70 by means of at least one rolling member, in particular a needle bearing. Such guiding of the main hub 70 makes it possible to ensure that it is correctly positioned and avoids wear of the main hub 70.

The fixed distributor 80 can comprise a fluid network for supplying each of the actuating members 15*a*, 16*a*, 17*a*. The fixed distributor 80 advantageously makes it possible to have only one fluid intake for all the actuating members 15*a*, 16*a*, 17*a*, which simplifies the device. The fluid network is made in a part that is fixed in rotation, the structure and operation of which are simplified compared with a fluid inlet in a rotating part, for example a gearbox shaft. Such a device makes it possible to have just one fluid intake for actuating the clutches, which simplifies the manufacture of the device.

The main hub 70 comprises at least one duct, and preferably a plurality of ducts, adapted to connect the fluid network to the various actuating members 15*a*, 16*a*, 17*a*.

The fluid network opens on the side facing the gearbox By. The side facing the gearbox BV is an accessible environment compared with the side facing the internal combustion engine, which for its part is congested and not readily accessible.

The fluid network of the fixed distributor 80 comprises a first series of circumferentially offset axial ducts which open onto one and the same circumferential groove, itself also formed in the fixed distributor 80 so as to supply the actuating members 15*a*, 16*a*, 17*a* with fluid. Facing each circumferential groove there are provided openings in the main hub 70 for the passage of the fluid to each of the actuating members 15*a*, 16*a*, 17*a*. The fluid network also comprises a second series of circumferentially offset axial ducts which open onto one and the same circumferential groove for the passage of a fluid for cooling the clutches.

For each clutch 15, 16, 17, the fluid network can comprise a single series of axial ducts for cooling and supplying fluid to the actuating members 15*a*, 16*a*, 17*a*.

Sealing rings, for example made from plastic, are provided on either side of each circumferential groove. The rolling members of the main hub 70 can surround the circumferential grooves.

Said lower part 100 of the rotor support 10 also comprises a fluid duct for cooling the input clutch 15 and a fluid duct for supplying the actuating member 15*a* of the input clutch 15. The fluid duct of the lower part 100 opens into the first portion 101 and faces a conduit associated with the main hub 70 and with the fixed distributor 80. The fluid connection between the main hub 70 and the first portion 101 of the lower part 100 of the rotor support 10 is situated at the splined connection. O-rings are situated on either side of the fluid connection between the main hub 70 and the first portion 101 of the lower part 100 in order to seal the fluid connection.

The device 1 also comprises an intermediate torque transmission element 35 between the input element 2 and the input clutch 15.

The device 1 defines an oil-filled sealed chamber 45 in which the set of clutches is arranged. The clutches are therefore all of the wet type. The sealed chamber 45 is delimited in part by the rotor support 10 and by the intermediate element 35.

The device 1 additionally comprises a fixed wall 50, secured for example to a fixed portion of the gearbox. The fixed wall 50 is, for example, screwed to the gearbox. The fixed wall 50 takes the form of a radial extension.

The fixed wall 50 comprises a first radial end 50*a* capable of being fastened to the gearbox By, and a second radial end 50*b* connected to the torque input element 2.

The second radial end 50*b* is a separate part and is connected to the fixed wall 50 by a weld. Alternatively, the second radial end 50*b* can be the same part as the fixed wall 50. The second radial end 50*b* of the fixed wall 50 has a shape substantially in the form of a "C" when it is seen in section.

The fixed wall 50 supports the rotor support 10. The fixed wall 50 centers and rotationally guides the rotor support 10. The fixed wall 50 is arranged axially in the vicinity of the stator 14 and of the rotor 13 and also makes it possible to form sealing of the torque transmission device. The axial distance and/or the material and/or the shape of said fixed wall 50 are chosen to minimize the Joule losses of the stator field within said fixed wall 50.

The fixed wall 50 is centered on the torque input element 2 by means of a needle bearing 51 arranged at the radially inner periphery of the fixed wall 50. In other words, the needle bearing 51 is arranged inside the "C" of the second radial end 50*b* of the fixed wall 50.

A means for rotational guiding here, likewise a needle bearing 53, is provided to axially wedge the torque input element 2 on the second output element 8. The same guide means is provided between the two output elements 5 and 8.

The intermediate element 35 is also borne radially by a transverse partition 61. The transverse partition 61 is additionally adapted to center the intermediate element 35. The intermediate element 35 can be centered and borne radially by means of a rolling member, here a needle bearing arranged between an end of the transverse partition 61 and a rim of the lower part 100 of the rotor support 10.

The transverse partition 61 is situated axially between the input clutch 15 on the one hand and the first output clutch 16 and the second output clutch 17 on the other hand. The transverse partition 61 is connected to the intermediate element 35 on the one hand and to the rotor support 10 on the other hand. The transverse partition 61 is fastened, for example by welding, or only driven to rotate by the drive element 35.

The intermediate element 35 is connected to the input element 2. The torque input element 2 comprises a splined hub 75 for the passage of the torque coming from the crankshaft of the combustion engine. A tightness seal of the lip seal type is arranged between the fixed wall 50 and the splined hub 75.

The intermediate element 35 comprises a cylindrical skirt 76 for driving the input clutch 15, and a connection portion 77 connected to the splined hub 75 of the torque input element and the cylindrical skirt 76.

The cylindrical skirt 76 extends radially between the rotor 13 and the output clutches 16, 17. This cylindrical skirt 76 makes it possible to transmit the torque from the combustion engine side to the gearbox side. The cylindrical skirt 76 extends radially inside the rotor support 10. In the example under consideration, the connection portion 77 and the cylindrical skirt 76 are in one piece and connected in rotation to the splined hub 77.

A first rolling member R1 is arranged between the rotor support 10 and the fixed distributor 80. This first rolling member R1 makes it possible to center and rotationally guide the rotor support 10 with respect to the fixed distributor 80. The first rolling member R1 is of the ball bearing type with one row of balls.

The first rolling member R1 comprises an inner ring R1$a$ and an outer ring R1$b$, said inner ring R1$a$ being in contact with the fixed distributor 80, and said outer ring R1$b$ being in contact with the rotor support 10. Said outer ring R1$b$ of the first rolling member R1 is more precisely in contact with the second portion 102 of the lower part 100 of the rotor support 10.

The first rolling member R1 is blocked axially between a shoulder of the lower part 100 of the rotor support 10 and a shoulder of the fixed distributor 80. The shoulder of the lower part 100 is situated at the second portion 102. Thus, the outer ring R1$b$ of the first rolling member R1 is blocked axially by the shoulder of the lower part 100 of the support rotor 10, and the inner ring R1$a$ of the first rolling member R1 is blocked axially by the shoulder of the fixed distributor 80.

The screw theory in respect of the mechanical actions which can be transmitted by the first rolling member R1 is therefore similar to that of a ball-joint connection, since the inner ring R1$a$ and outer ring R1$b$ are blocked axially.

A second rolling member R2 is arranged between the rotor support 10 and the fixed wall 50. This second rolling member R2 makes it possible to center and rotationally guide the rotor support 10 with respect to the fixed wall 50. The second rolling member R2 is of the ball bearing type with one row of balls.

The second rolling member R2 comprises an inner ring R2$a$ and an outer ring R2$b$, said inner ring R2$a$ being in contact with the fixed wall 50, and said outer ring R1$b$ being in contact with the rotor support 10. Said outer ring R2$b$ of the second rolling member R2 is more precisely in contact with the first transverse wall 11 of the rotor support 10.

The second rolling member R2 is blocked axially between a shoulder of the first transverse wall 11 of the rotor support 10 and a shoulder of the fixed wall 50. The shoulder of the fixed wall 50 is situated at the second radial end 50$b$. Thus, the outer ring R2$b$ of the second rolling member R2 is blocked axially by the shoulder of the first transverse wall 11 of the rotor support 10, and the inner ring R2$a$ of the second rolling member R2 is blocked axially by the shoulder of the second radial end 50$b$ of the fixed wall 50.

The screw theory in respect of the mechanical actions which can be transmitted by the second rolling member R2 is therefore similar to that of a ball-joint connection, since the inner ring R2$a$ and outer ring R2$b$ are blocked axially.

The combination of these two rolling members R1, R2 therefore makes it possible to produce a pivot connection between the rotor support 10 and a fixed element or an element fastened to the gearbox, namely the fixed distributor 80 and the fixed wall 50.

The torque transmission device 1 of FIG. 2 is substantially identical to the torque transmission device 1 of FIG. 1 apart from the mounting of the second rolling member R2.

Specifically, in FIG. 2, the second rolling member R2 comprises an inner ring R2$a$ and an outer ring R2$b$, said inner ring R2$a$ being in contact with the rotor support 10, and said outer ring R2$b$ being in contact with the fixed wall 50. Said inner ring R2$a$ of the second rolling member R2 is more precisely in contact with the first transverse wall 11 of the rotor support 10.

The second rolling member R2 is blocked axially between a shoulder of the first transverse wall 11 of the rotor support 10 and a shoulder of the fixed wall 50. The shoulder of the fixed wall 50 is situated at the second radial end 50$b$. Thus, the inner ring R2$a$ of the second rolling member R2 is blocked axially by the shoulder of the first transverse wall 11 of the rotor support 10, and the outer ring R2$b$ of the second rolling member R2 is blocked axially by the shoulder of the second radial end 50$b$ of the fixed wall 50.

This variant embodiment of the mounting of the second rolling member R2 makes it possible to limit the radial bulk of the connection between the fixed wall 50 and the torque input element 2, since it makes it possible to dispense with an axial wall of the fixed wall 50 and/or of the rotor support 10.

Although the invention has been described in connection with a several particular embodiments, it is quite evident that it is not at all limited thereto and comprises all technical equivalents of the means described and their combinations if these fall within the scope of the invention.

In the claims, all reference signs between parentheses should not be interpreted as limiting the claim.

The invention claimed is:

1. A torque transmission device, comprising:
   a torque input element configured to be coupled in rotation to a crankshaft of a combustion engine,
   a first torque output element configured to be coupled in rotation to a first input shaft of a gearbox,
   a rotating electric machine comprising a stator and a rotor arranged in the direction of the transmission of torque, between the input element and the first output element,
   a rotor support radially supporting the rotor of the rotating electric machine, the rotor support being selectively connected to the input element by an input clutch,
   a fixed distributor configured to be fastened to the gearbox and supporting the rotor support,
   a fixed wall comprising a first radial end configured to be fastened to the gearbox, and a second radial end connected to the torque input element,
   a first rolling member is arranged between the rotor support and the fixed distributor, and a second rolling member is arranged between the rotor support and the fixed wall, and
   a second torque output element configured to be coupled in rotation to a second input shaft of the gearbox, the second output element being arranged in parallel with the first output element in the direction of the transmission of torque.

2. The torque transmission device as claimed in claim 1, wherein the rotor support comprises a first transverse wall, a second transverse wall and a back connecting the two transverse walls.

3. The torque transmission device as claimed in claim 2, wherein the rotor support forms an inverted U-shape when viewed in section.

4. The torque transmission device as claimed claim 1, further comprising:
   a main hub connected to the first output element via a first output clutch.

5. The torque transmission device as claimed in claim 4, wherein the second transverse wall of the rotor support comprises a lower part, the lower part comprising a first portion connected to a main hub, and a second portion.

6. The torque transmission device as claimed in claim 5, wherein the first portion of the lower part of the rotor support is in splined connection with the main hub.

7. The torque transmission device as claimed in claim 1, wherein the first rolling member comprises an inner ring and an outer ring, the inner ring being in contact with the fixed distributor, and the outer ring being in contact with the rotor support.

8. The torque transmission device as claimed in claim 7, wherein
the second transverse wall of the rotor support comprises a lower part, the lower part comprising a first portion connected to a main hub, and a second portion, and,
the outer ring of the first rolling member is in contact with the second portion of the lower part of the rotor support.

9. The torque transmission device as claimed in claim 1, wherein the second rolling member comprises an inner ring and an outer ring, the inner ring being in contact with the fixed wall, and the outer ring being in contact with the rotor support.

10. The torque transmission device as claimed in claim 9,
the rotor support comprises a first transverse wall, a second transverse wall and a back connecting the two transverse walls, and
the outer ring of the second rolling member is in contact with the first transverse wall of the rotor support.

11. The torque transmission device as claimed in claim 1, wherein the second rolling member comprises an inner ring and an outer ring, the inner ring being in contact with the rotor support, and the outer ring being in contact with the fixed wall.

12. The torque transmission device as claimed in claim 11, wherein
the rotor support comprises a first transverse wall, a second transverse wall and a back connecting the two transverse walls, and
said inner ring of the second rolling member is in contact with the first transverse wall of the rotor support.

* * * * *